Patented Aug. 7, 1923.

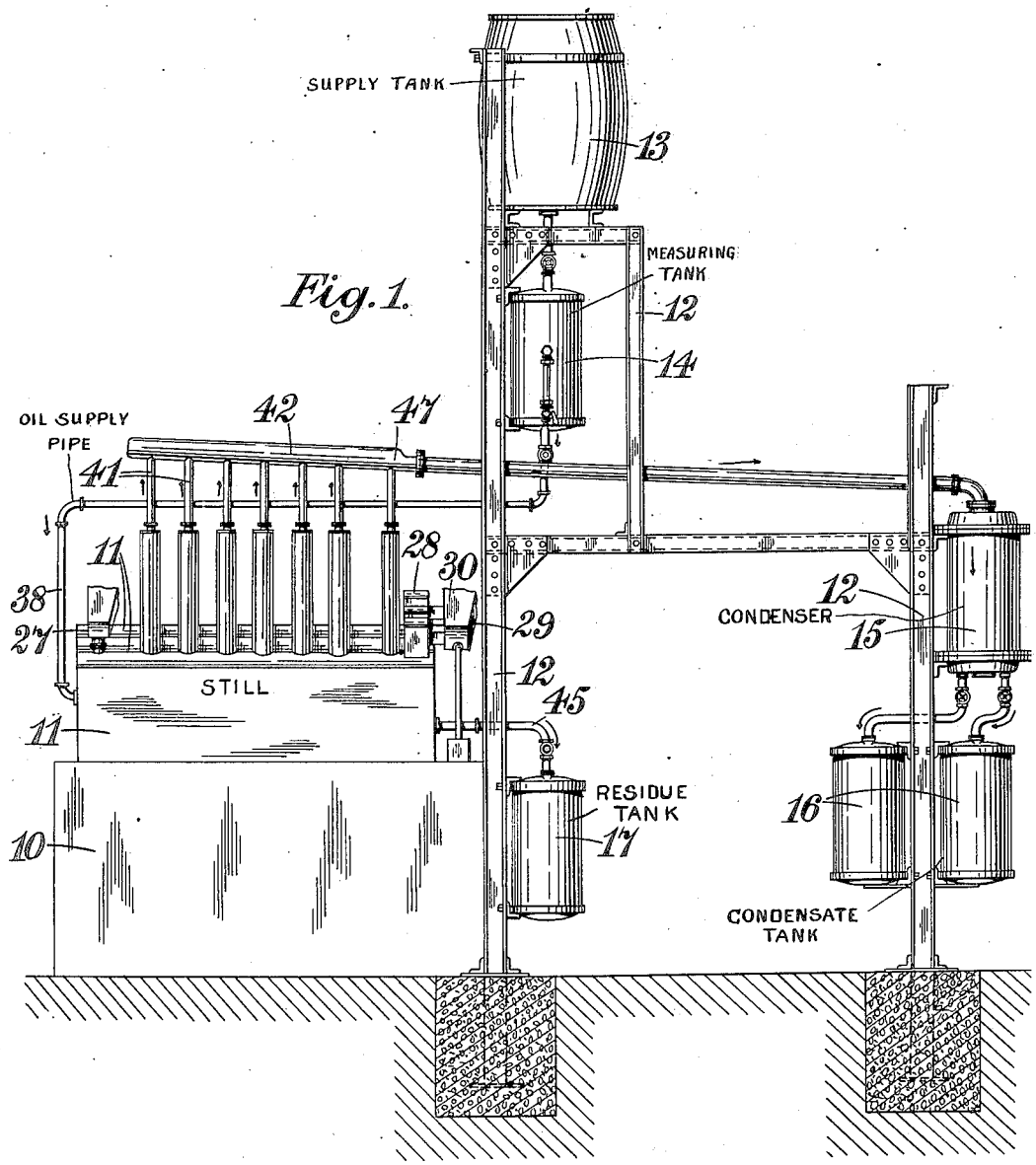

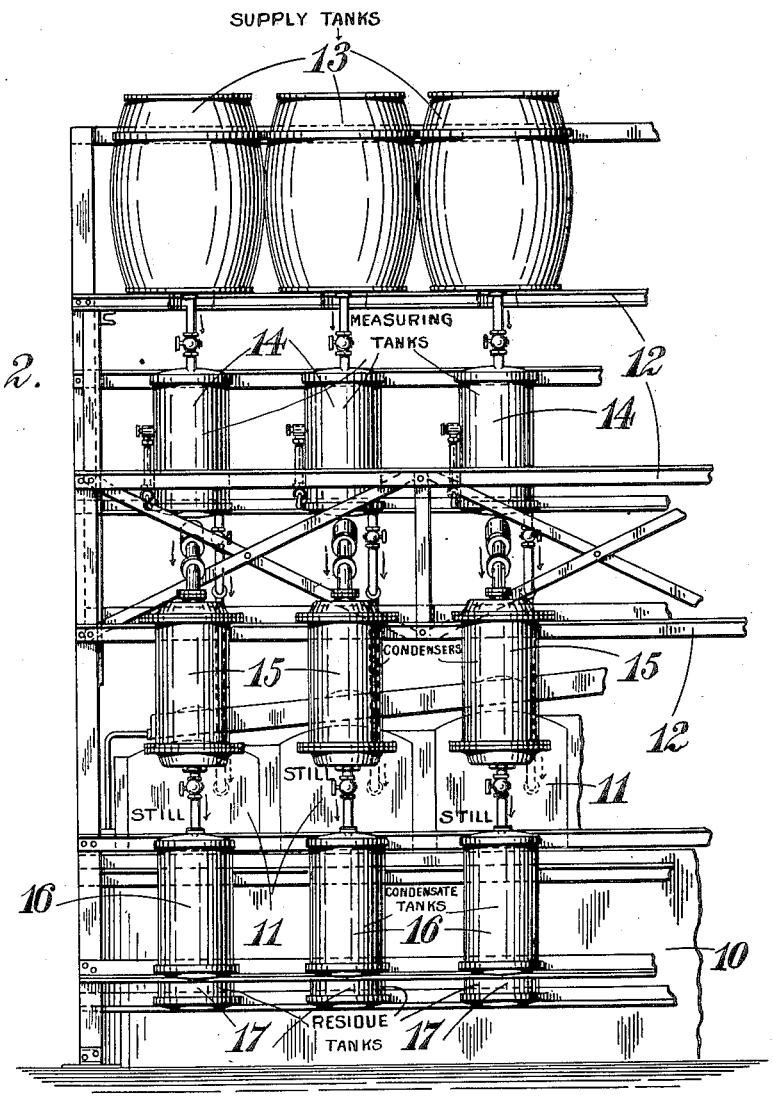

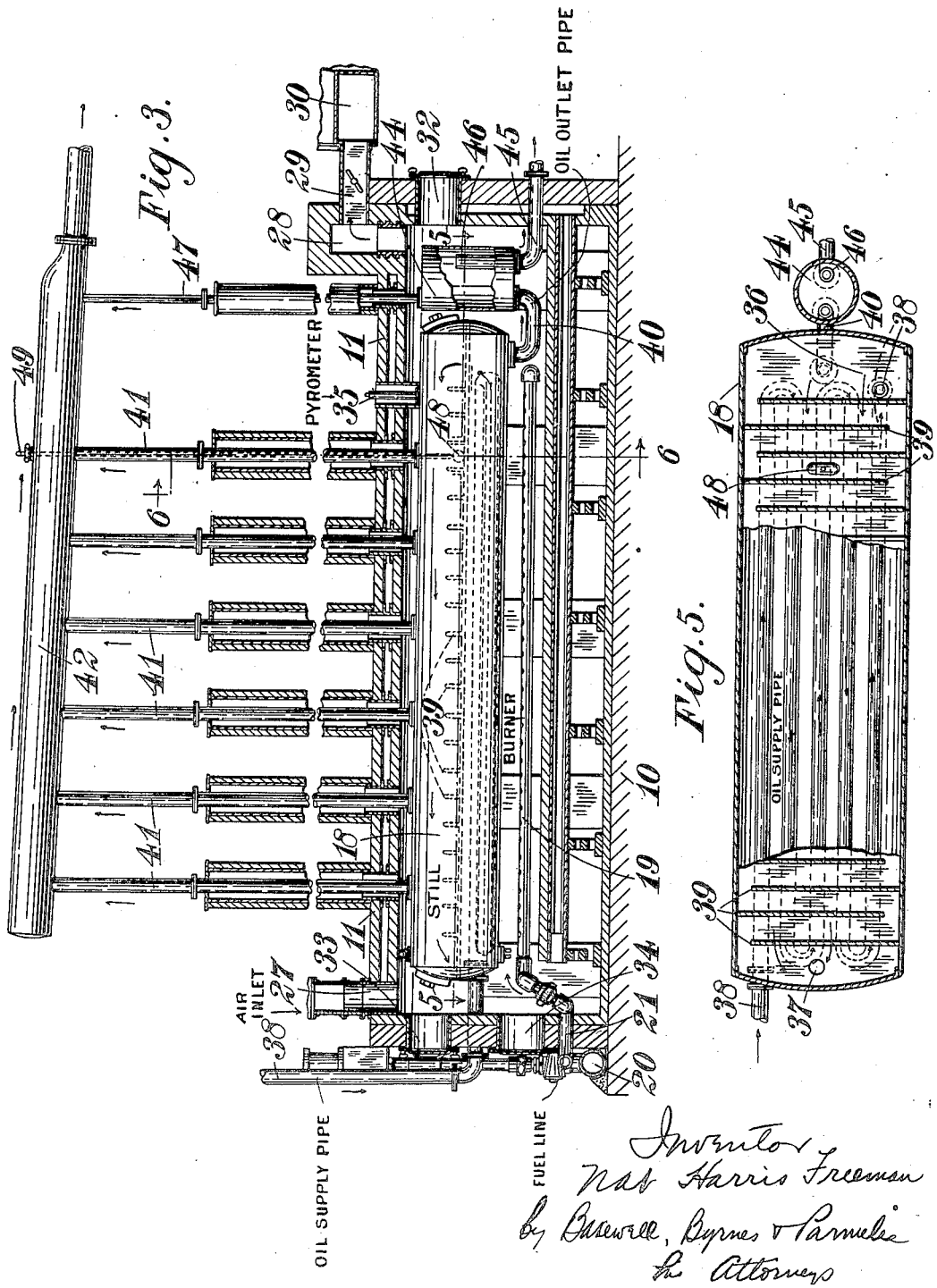

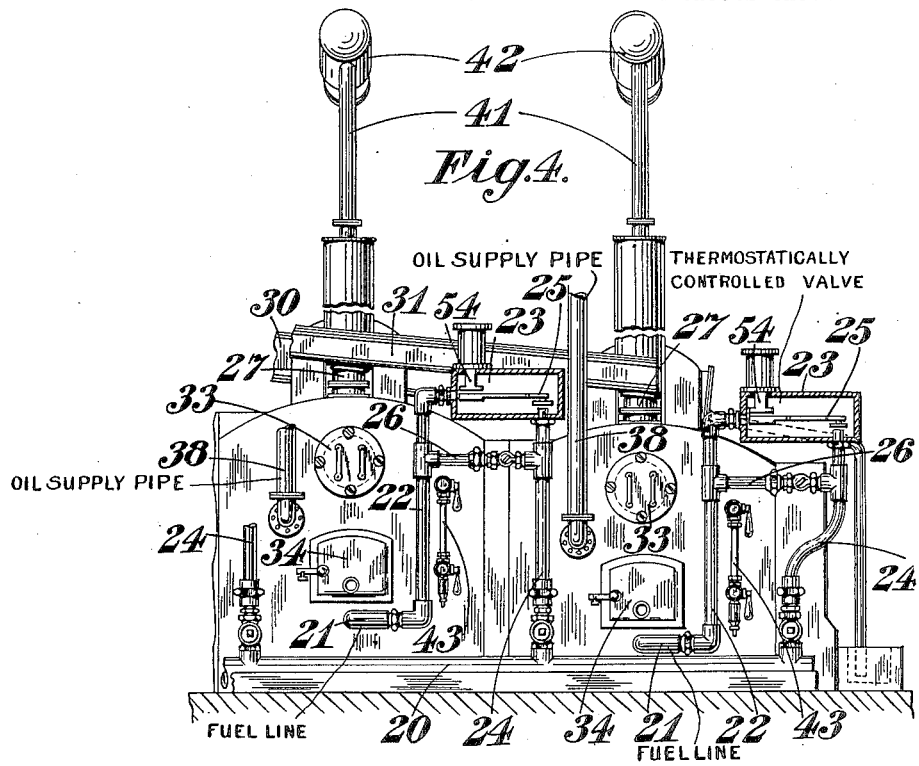
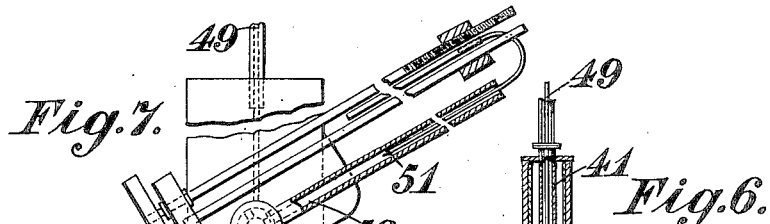
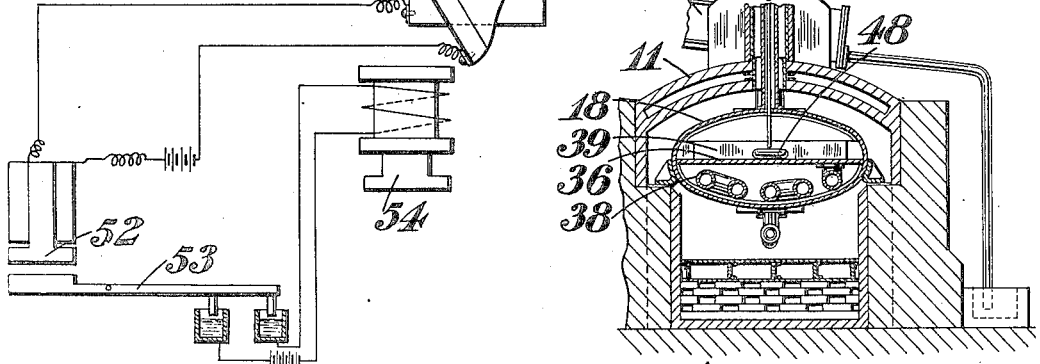

1,464,246

UNITED STATES PATENT OFFICE.

NAT HARRIS FREEMAN, OF HOLBORN, LONDON, ENGLAND.

DISTILLING APPARATUS.

Application filed February 3, 1921. Serial No. 442,197.

*To all whom it may concern:*

Be it known that I, NAT HARRIS FREEMAN, a citizen of the United States of America, residing at Holborn, London, England, have invented certain new and useful Improvements in Distilling Apparatus, of which the following is a specification.

This invention is for improvements in or relating to distilling apparatus and has for one of its objects to provide for the production of products wherein variations in chemical and physical properties are reduced to a minimum.

The distillation and carbonization of oils, lignite, coals, shale and other substances being usually conducted in a vessel in which the temperature is gradually increased produces distillates which are mixtures of varied gravities and boiling points, each degree or few degrees increase in temperature producing a distillate with a lower Baumé gravity than the distillate produced at a lower temperature, thus producing a result or product which is not homogeneous, and residues the chemical and physical properties of which are highly variable. It has, however, been proposed to provide means for automatically controlling the temperature in furnaces, ovens, retorts and other apparatus so as to maintain it fixed at any desired predetermined temperature, and it has further been proposed in carbonizing or distilling apparatus to pass the material under treatment in a zigzag manner through a series of superposed compartments by means of stirrers or scrapers, each compartment being heated separately in a controllable manner. My own prior British Patent Specifications No. 120,590 and No. 124,015 may be instanced as describing efficient apparatus of the type in question.

The apparatus according to the present invention is suitable for dealing with many liquids but is particularly applicable for fractionally distilling oil. It is hereinafter described, therefore, in connection with the treatment of oil but it is to be understood that any other suitable liquid is intended to be included in the term "oil."

According to the primary feature of the present invention there is provided a distilling apparatus for oil and other liquids which comprises in combination a still through which the liquid passes for treatment, means for retarding the flow of liquid through the still, and automatic means for controlling the supply of heat to the still so as to maintain the working temperature of the still constant, said controlling means preferably including a holder for fluid (for example a gas holder) which holder is intended to be placed in the still, and a conduit extending from said holder to one surface of a movable operating member (for example a column of mercury) which member is exposed at another surface to atmospheric pressure and can move into and out of operative position to control the heat supply to the still. Conveniently the plant comprises a plurality of stills and apparatus combined with each as just specified, and a different constant working temperature is maintained in each still in the set, and the distillate from certain of the stills is passed for treatment into other stills in the set wherein a lower working temperature is maintained, and the residue from certain of the stills is passed into other stills in the set wherein a higher working temperature is maintained.

Other features of the invention relate to the construction of the still itself and to the general arrangement of the apparatus.

For a more complete understanding of the invention there will now be described, by way of example only and with reference to the accompanying drawings one constructional arrangement of distilling apparatus for oils and other liquids according to the present invention. It is to be understood, however, that the invention is not limited to the precise constructional details set forth.

In these drawings—

Figure 1 is a side elevation of a portion of the apparatus;

Figure 2 is an end elevation thereof;

Figure 3 is a side elevation, partly in section of a single still and certain connected parts, on a scale larger than that of Figures 1 and 2;

Figure 4 is an elevation, on a scale smaller than that of Figure 3, and looking on the end of two stills and certain connected parts, the view being taken in an opposite direction to that of Figure 2;

Figure 5 is a sectional plan of a still and certain connected parts, the section being taken on the line 5—5 of Figure 3;

Figure 6 is a cross section on the line 6—6 of Figure 3, and

Figure 7 is a detail view of parts of a temperature controlling device, the view being more or less diagrammatic.

Like reference numerals indicate like parts throughout the drawings.

Referring firstly to Figures 1 and 2, it will be seen therefrom that upon a supporting foundation 10 a series of still chambers 11 are built, three being shown in the figures in question, but obviously the battery or set of still chambers may comprise any convenient number. Supported upon a suitable girder or other framework 12 are main storage tanks 13, measuring tanks 14, condensers 15, condensed distillate storage tanks 16 and still-residue storage tanks 17, the various receptacles being coupled to each other and to the stills by suitable valve-controlled pipe lines, one arrangement of which is illustrated by way of example in the drawings. In this arrangement, each still has appropriated to it, one main storage tank 13 which delivers into a measuring tank 14 from which the oil passes to the still. From the still the distillate passes to a condenser 15 which has two storage tanks 16 appropriated to it, one only being intended to be in use at a time. The residue from the still passes into a storage tank 17. In Figures 1 and 2 each still chamber with its connected tanks is shown as being a separate self-contained unit. Each still is equipped with an automatic temperature regulating device, preferably as hereinafter described, whereby the working temperature of each still is maintained constant. Conveniently, however, the constant working temperatures in successive stills are successively greater, the steps of variation being 5° C. or 10° C. or any other suitable amount. The residue from the tank 17 of one still may be passed into the storage tank 13 of another still in the set so as to be subjected to a higher temperature, and similarly the condensed distillate from the tanks 16 of one still may be passed for treatment into the storage tank 13 of another still in the set so as to be subjected to a lower temperature; or instead of this arrangement suitable valve-controlled pipe lines could be employed so that the distillate and residue from the stills can be passed directly into other stills for treatment at different temperatures, instead of passing through all of the tanks just described. To facilitate working on this latter scheme, the stills may be arranged at different heights as shown more particularly in Figures 2 and 4. With such a method of operation products will be produced which will have minimum variations in their chemical and physical properties.

Referring now more particularly to Figures 3 to 6, there is shown, inside a still chamber 11, a still 18 of oval cross-section which is supported in any suitable way by the walls of the still chamber. Below the still is a gas burner 19 for heating the still, this burner being supplied from a gas main 20. The burner 19 has a feed pipe 21 which reaches out through the walls of the still chamber to be connected by a pipe 22 to the box 23 of an automatic gas supply controlling mechanism. This box 23 is connected by a pipe 24 to the gas main 20. Intake of gas from the pipe 24 into the box 23 is regulated by an electrically controlled valve 25 (referred to again hereinafter) which can be opened and shut to vary the supply of gas to the burner 19 and thus control the temperature to which the still is heated. To prevent the burner flame from being completely extinguished, a by-pass pipe 26 is provided which connects the two pipes 22 and 24.

Air for combustion, preheated if desired, enters the still chamber through a supply conduit 27 and the products of combustion are evacuated through a conduit 28 which is connected by a baffle-controlled passage 29 to a main delivery shaft 30. The air intake pipes 27 from various stills may be supplied from a main shaft 31, see Figure 4. Suitable inspection and cleaning apertures 32, 33 and 34, having appropriate closures are preferably fitted in the end walls of the still chambers, while to enable the temperature of the chamber to be determined a pyrometer 35 may be fitted.

The still 18 is preferably provided with an internal, substantially horizontal, partition 36, see Figures 3, 5 and 6, which divides it into two compartments communicating with each other through a perforation 37 in the partition towards one end of the still. The oil supply pipe 38 communicates with the upper compartment and delivers on to the upper surface of the partition 36 towards the other end of the still, it traversing the lower compartment in a sinuous path as will be clearly seen from Figure 5 before it reaches the upper compartment. Thus ample opportunity is given for the oil in the pipe to be heated before its delivery on to the upper surface of the partition 36. From its point of delivery on to the upper surface of the partition 36 the oil has to travel the full length of the partition in order to reach the perforation 37, the partition 36 being sloped, if desired, in order to assist the flow of the oil. To cause the oil to traverse an extended path, however, before it reaches the perforation 37, the upper surface of the partition 36 is provided with baffles 39 which alternately extend from one and the other side wall of the still almost to the opposite wall. Ample opportunity is thus given for the distillate to be evolved from the oil. After it has passed through the perforation 37 the oil travels the length of the lower compartment of the still to reach its delivery conduit 40 and it will be observed that the oil supply pipe 38, while in the lower compartment, is immersed in the oil flowing towards the pipe 40. It thus receives heat from the said oil which, of course, is the residue from the particular still in question. The distillate is collected from the still by a series of pipes 41 leading to a main conduit 42 and this conduit 42 may either deliver this distillate into the condenser 15, as shown in Figure 1, or may convey it to a still of lower working temperature according to circumstances. The pipes 41 may be jacketed if desired. The still may be provided with an external gauge glass 43 for reading the height of liquid contained in it, and this height may be automatically controlled by a chamber 44 into which the delivery pipe 40 leads. Leading from this chamber 44 is another pipe 45 whereof the end 46 stands at the height at which it is desired to maintain the oil in the still, this height being usually somewhere about half way up the baffles 39. From the chamber 44 the pipe 46 may lead the residue to a tank 17 as shown in Figure 1 or to another still of higher working temperature. In order to collect any distillate evolved in the chamber 44, a pipe 47 is led therefrom to the conduit 42.

To maintain the temperature constant in the still, a device as illustrated in my prior British Patent Specification No. 120,590 may be here employed. This is illustrated also, more or less diagrammatically, in Figure 7. It comprises a gas bulb or holder 48 which is intended to be placed in the still, see Figures 3 and 6, and a conduit 49 extending from said bulb to one surface of a movable column of mercury contained in a tube 50. This column of mercury is exposed at the end of the tube 50 to atmospheric pressure and can move into and out of operative engagement with a contact 51 as the gas in the bulb 48 expands and contracts. When the column of mercury reaches the contact 51 it closes a relay circuit whereof the movable member 52 operates a contact device 53 to close another circuit which in turn operates a member 54. This member 54, see Figure 4, operates the valve 25 controlling the gas supply. Thus as the temperature in the still rises above what it should be, the gas in the bulb 48 expands and through the circuits shuts off the gas from the burner 19. Then as soon as the temperature in the still has fallen sufficiently, the gas in the bulb contracts enough to move the mercury out of engagement with the contact 51 whereupon a further supply of gas is led to the burner. Conveniently the conduit 49 is led into the still through one of the pipes 41, as illustrated in the drawings.

From the foregoing it should be appreciated that the apparatus according to the present invention can operate continuously and that it will enable oil or other liquid to be fractionally distilled with a great degree of accuracy and with great efficiency so far as the composition of the resultant products is concerned.

What I claim as my invention and desire to secure by Letters Patent is:—

1. Distilling apparatus for oil and other liquids, comprising in combination a still through which the liquid passes for treatment, an internal, substantially horizontal, partition in said still dividing it into two separate superposed compartments which communicate with each other only through the partition by way of a perforation towards one end of the still, said still having in the upper compartment an outlet for distillate, and in the lower compartment an outlet for residue at the end remote from said perforation, a supply conduit for liquid communicating with the upper compartment and delivering on to the partition towards the end of the still remote from said perforations, a delivery conduit for liquid communicating with the outlet of the lower compartment, means for supplying heat to the still, and thermostatic means for automatically controlling the supply of heat to the still so as to maintain the working temperature of the still constant.

2. Distilling apparatus for oil and other liquids, comprising in combination a still through which the liquid passes for treatment, an internal, substantially horizontal, partition in said still dividing it into two superposed compartments which communicate with each other only through the partition by way of a perforation situated towards one end of the still, said still having in the upper compartment an outlet for distillate, and in the lower compartment an outlet for residue at the end remote from said perforation, a supply conduit for liquid communicating with the upper compartment and delivering on to the partition towards the end of the still remote from said perforation, a delivery conduit for liquid communicating with the lower compartment, baffles on the upper surface of said partition so arranged as to cause the liquid to traverse a horizontally sinuous path from its point of delivery onto the partition to the point at which it flows into the lower compartment, means for supplying heat to the still, and thermostatic means for automatically controlling the supply of heat to the still so as to maintain the working temperature of the still constant.

3. Distilling apparatus for oil and other liquids, comprising in combination a still through which the liquid passes for treatment, an internal, substantially horizontal, partition in said still dividing it into two separate superposed compartments which communicate with each other only through the partition by way of a perforation situated towards one end of the still, said still having in the upper compartment an outlet for distillate, and in the lower compartment an outlet for residue, a supply conduit for liquid communicating with the upper compartment and delivering on to the partition towards the end of the still remote from said perforation, said conduit traversing in a sinuous path the lower compartment before delivering into the upper compartment, a delivery conduit for liquid communicating with the outlet of the lower compartment, means for normally maintaining the liquid level in the still above said partition, means for supplying heat to the still, and automatic means for controlling the supply of heat to the still so as to maintain the working temperature of the still constant.

4. Distilling apparatus for oil and other liquids, comprising in combination a still through which the liquid passes for treatment, an internal, substantially horizontal, partition in said still dividing it into two separate superposed compartments which communicate with each other only through the partition by way of at least one perforation situated towards one end of the still, said still having in the upper compartment an outlet for distillate, and in the lower compartment an outlet for residue situated at the end thereof remote from said perforation, a supply conduit for liquid communicating with the upper compartment and delivering onto the partition towards the end of the still remote from said perforation, a delivery conduit for liquid communicating with the said outlet of the lower compartment, the liquid supply conduit traversing the lower compartment and being immersed in the liquid therein before delivering into the upper compartment, means for supplying heat to the still, and automatic means for controlling the supply of heat to the still so as to maintain the working temperature of the still constant.

In testimony whereof I affix my signature.

NAT HARRIS FREEMAN.